(12) United States Patent
Yamauchi

(10) Patent No.: US 7,954,963 B2
(45) Date of Patent: Jun. 7, 2011

(54) LIGHT SOURCE AND PROJECTOR

(75) Inventor: Kentaro Yamauchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 617 days.

(21) Appl. No.: 12/041,125

(22) Filed: Mar. 3, 2008

(65) Prior Publication Data

US 2008/0239247 A1    Oct. 2, 2008

(30) Foreign Application Priority Data

Mar. 28, 2007    (JP) ................. 2007-083685

(51) Int. Cl.
*G03B 21/28* (2006.01)
*F21V 7/00* (2006.01)

(52) U.S. Cl. ....................................... 353/99; 362/297

(58) Field of Classification Search .................. 362/297, 362/296.06, 304, 346, 268; 353/98, 99
See application file for complete search history.

(56) References Cited

U.S. PATENT DOCUMENTS

| 5,532,763 A * | 7/1996 | Janssen et al. ............ 348/744 |
| 2007/0053190 A1* | 3/2007 | Janssen ..................... 362/297 |
| 2007/0058372 A1* | 3/2007 | Sacre et al. ............... 362/268 |

FOREIGN PATENT DOCUMENTS

| JP | A 07-219046 | 8/1995 |
| JP | A 09-222580 | 8/1997 |
| JP | A 10-050120 | 2/1998 |
| JP | A 2000-133024 | 5/2000 |
| JP | A 2001-242545 | 9/2001 |

* cited by examiner

*Primary Examiner* — William C Dowling
*Assistant Examiner* — Ryan Howard
(74) *Attorney, Agent, or Firm* — Oliff & Berridge, PLC

(57) ABSTRACT

A light source device includes a discharge lamp and a reflection mirror having a plurality of concave curved surfaces. Each of the plurality of concave curved surfaces is an ellipsoidal surface. A first focal point of each of the ellipsoidal surfaces is disposed at the light emitting center of the discharge lamp. A second focal point of each of the ellipsoidal surfaces is disposed, when viewed from a predetermined first direction perpendicular to a system optical axis passing through the light emitting center, on the opposite side of the system optical axis to the ellipsoidal surface, and when viewed from a second direction perpendicular to the system optical axis and the first direction, on the side where the ellipsoidal surface is present with reference to the system optical axis.

14 Claims, 4 Drawing Sheets

LIGHT SOURCE AND PROJECTOR

BACKGROUND

1. Technical Field

The present invention relates to a light source device having a discharge lamp as a light emitting source and a reflection mirror that collects light from the discharge lamp, and a projector using the same.

2. Related Art

An example of a light collection reflector used in an illumination system of a liquid crystal projector or the like is a multi-facet reflector, each facet using, for example, an ellipsoidal surface. When such a multi-facet reflector is used, a large number of light source device images are visibly focused on the illuminated area, causing non-uniformity in illuminance and color. To address such a problem, a light collection reflector has been designed in which it has a reflection surface section shaped into a substantially quadratic surface of revolution with an axis oriented toward the center of the illuminated area and the reflection surface section is divided into sub-reflection surfaces, each of which is adjusted and inclined to the axis (for example, JP-A-9-222580, JP-A-10-50120, and JP-A-2001-242545).

The light collection reflector described above can collect light efficiently and illuminate the intended area with less non-uniformity in illuminance and color. However, since the reflection surface section is circular when viewed from the front and formed of a plurality of surfaces, the optical axis of each of which extends outward, such a light collection reflector has limitations in terms of reduction in its thickness and size. Further, the light collection reflector described above is difficult to manufacture, not easy to ensure the accuracy, and suffers great loss of light.

SUMMARY

An advantage of some aspects of the invention is to provide a thinner or smaller light source device without sacrificing the performance of the reflector, and a projector incorporating the same.

According to an aspect of the invention, there is provided a light source device including a discharge lamp that generates light-source light, and a reflection mirror having a plurality of concave curved surfaces that reflect the light-source light emitted from the discharge lamp, wherein each of the plurality of concave curved surfaces is a ellipsoidal surface, a first focal point of each of the ellipsoidal surfaces that form the plurality of concave curved surfaces is disposed at the light emitting center of the discharge lamp, and a second focal point of each of the ellipsoidal surfaces that form the plurality of concave curved surfaces is disposed, when viewed from a predetermined first direction perpendicular to a system optical axis passing through the light emitting center, on the opposite side of the system optical axis to the ellipsoidal surface, and when viewed from a second direction perpendicular to the system optical axis and the first direction, on the side where the ellipsoidal surface is present with reference to the system optical axis.

In the light source device described above, the reflection mirror as the reflector is divided into a plurality of concave curved surfaces. A first focal point of each of the concave curved surfaces, that is, the ellipsoidal surfaces is disposed at the light emitting center of the discharge lamp, and a second focal point of each of the ellipsoidal surfaces is disposed, when viewed from the first direction (the horizontal direction perpendicular to the system optical axis, for example), on the opposite side of the system optical axis to the ellipsoidal surface, and when viewed from the second direction (the upward direction perpendicular to the system optical axis, for example), on the side where the ellipsoidal surface is present with reference to the system optical axis. That is, when viewed from the first direction, the concave curved surfaces on opposite sides of the system optical axis (the concave curved surfaces disposed on the upper and lower sides of the system optical axis, for example) are disposed in such a way that the distance between the front ends of ellipsoidal surfaces decreases, when viewed from the second direction, the concave curved surfaces on opposite sides of the system optical axis (the concave curved surfaces disposed on the right and left sides of the system optical axis, for example) are disposed in such a way that the distance between the front ends of ellipsoidal surfaces increases. As a result, the light paths of the light-source light fluxes reflected off the concave curved surfaces are disposed in a twisted manner with respect to the system optical axis. Therefore, the light-source light fluxes from the concave curved surfaces are minimally blocked by the discharge lamp when they are outputted, and at the same time, the size of the reflector can be reduced in terms of the width perpendicular to the system optical axis when viewed from the first direction, that is, the width in the second direction. It is thus possible to increase the usage efficiency of light and reduce the thickness of the reflector and hence the light source device.

It is preferable that the reflection mirror is formed of at least four concave curved surfaces. In this case, by dividing the reflection mirror into four or more, the thickness of the reflector can be further reduced.

It is preferable that in the reflection mirror, the boundary between an adjacent pair of the concave curved surfaces is disposed in a plane including the system optical axis. In this case, the boundary between an adjacent pair of the concave curved surfaces and the system optical axis are disposed in the same plane, and each of the concave curved surfaces has a fan-shaped contour radially expanding from the system optical axis. It is therefore possible to prevent loss of light when outputted along the light path close to the system optical axis.

It is preferable that the light source device further includes a sub-mirror that reflects the light-source light emitted from the discharge lamp toward the side of the reflection mirror. In this case, the sub-mirror can guide the light that the reflector cannot collect among the light emitted from the discharge lamp to the reflector.

It is preferable that at least one of a lead wire and a trigger wire extending from the discharge lamp is disposed in a specific plane including the system optical axis and the boundary between an adjacent pair of the concave curved surfaces. In this case, by disposing the lead wire and the trigger wire along a specific plane including the system optical axis and the boundary between an adjacent pair of the concave curved surfaces, it is possible to reduce loss of light due to wiring.

It is preferable that the light source device further includes a collimator lens having a plurality of lens portions that collimate the light reflected off the concave curved surfaces of the reflection mirror, and a prism having a plurality of prism portions that adjust the light collimated by the plurality of lens portions to be parallel to the system optical axis. In this case, it is possible to make the light reflected off the reflection mirror as a whole parallel to the system optical axis.

It is preferable that the collimator lens and the prism are disposed at positions outside the region where the light fluxes from the plurality of concave curved surfaces intersect one another. In this case, it is possible to individually collimate the light fluxes from the concave curved surfaces and make the collimated light fluxes parallel to the system optical axis without superimposing the reflected light fluxes from the concave curved surfaces, resulting in uniform light fluxes.

According to another aspect of the invention, there is provided a projector including any of the light source devices described above, a light modulator illuminated with the illumination light from the light source device, and a projection system that projects image light from the light modulator. In this case, the projector can be smaller and lighter by reducing the size of the light source device.

BRIEF DESCRIPTION OF THE DRAWINGS

The invention will now be described with reference to the accompanying drawings, wherein like numbers refer to like elements.

DESCRIPTION OF EXEMPLARY EMBODIMENTS

1. Light Source Device

Figure 1:
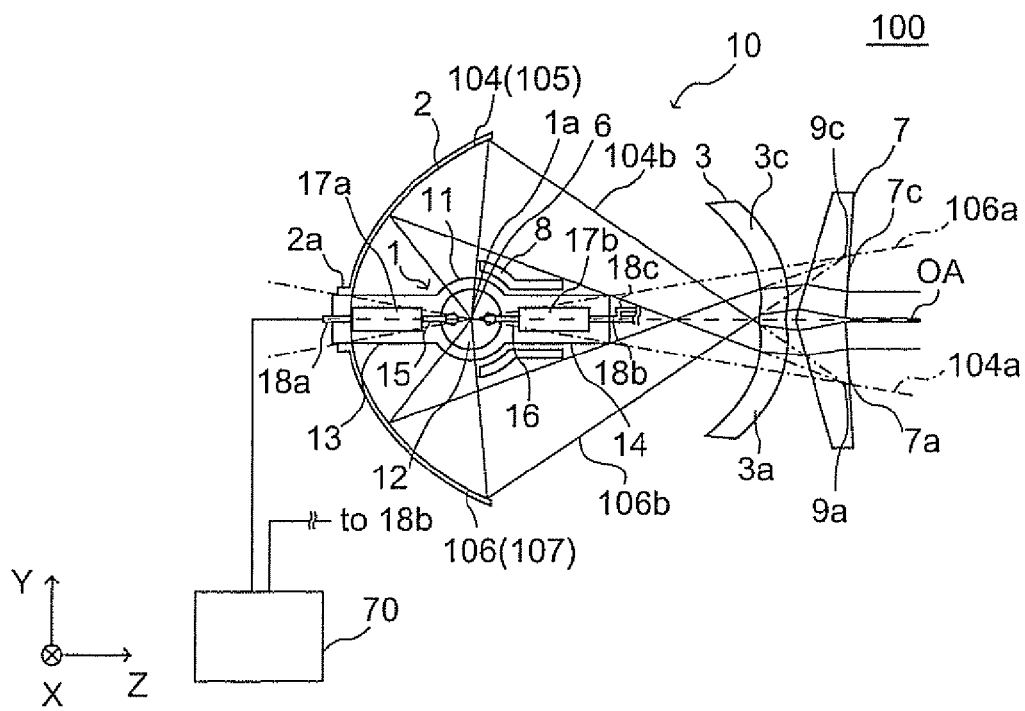
FIG. 1 is a side cross-sectional view for explaining a light source device according to an embodiment.
Figure 2:
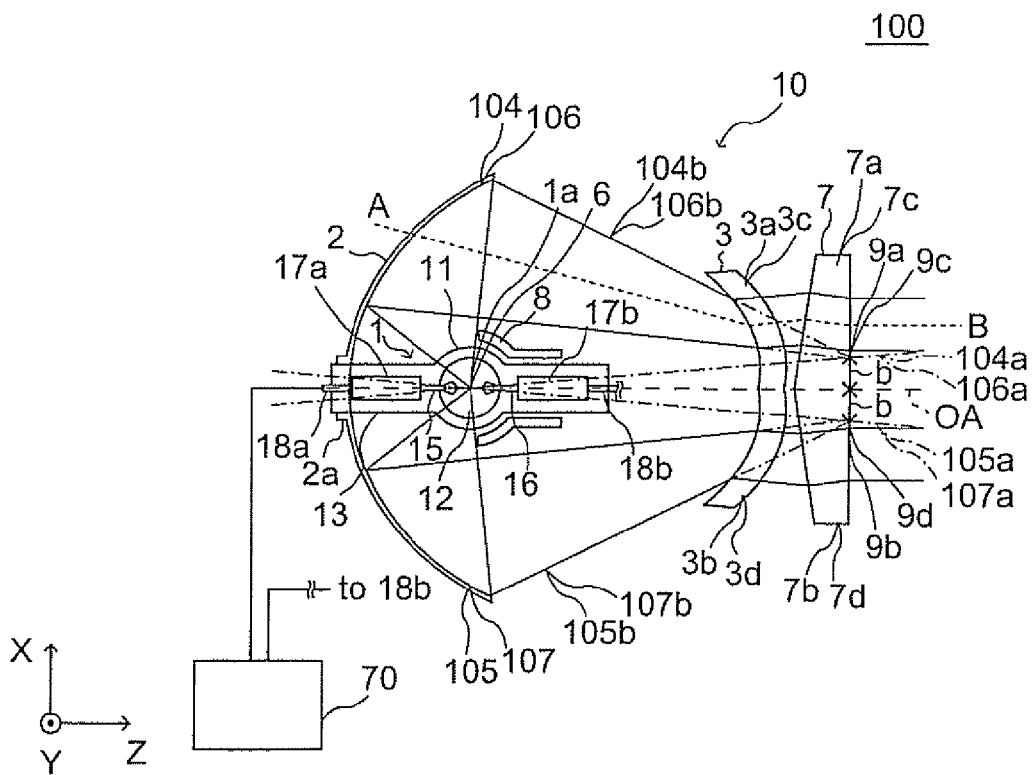
FIG. 2 is a plan cross-sectional view of the light source device shown in FIG. 1.
Figure 3:
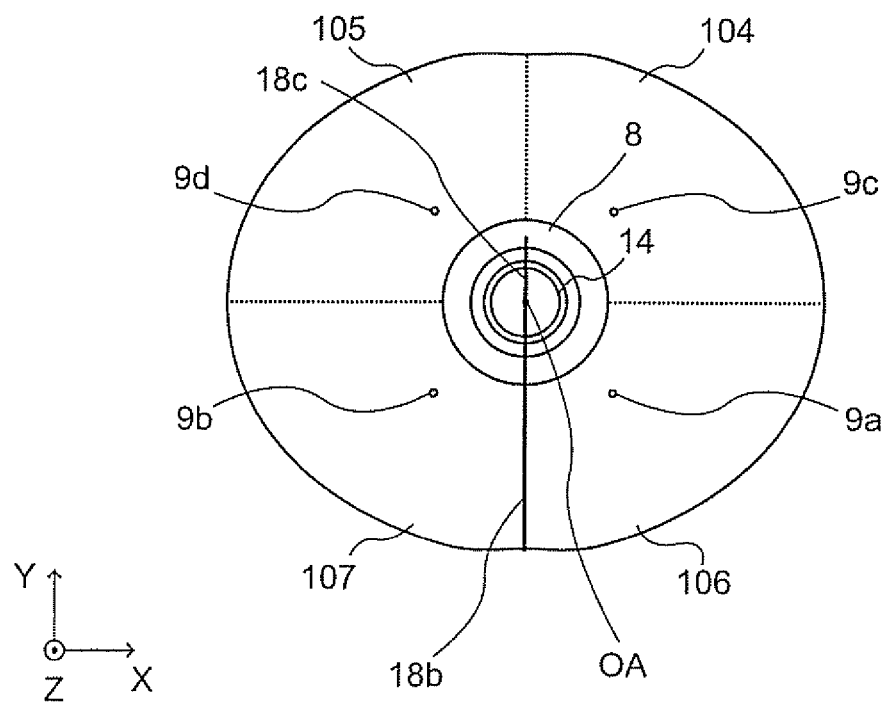
FIG. 3 is the front view of the light source device shown in FIG. 1.

FIG. 1 is a side cross-sectional view showing a light source device according to an embodiment of the invention. FIG. 2 is a plan cross-sectional view of FIG. 1. FIG. 3 is the front view of FIG. 1. The light source device 100 of this embodiment includes a light source unit 10 and a power supply 70. The light source unit 10 includes a discharge lamp 1 of discharge light emission type, a reflector 2, which is an ellipsoidal reflection mirror, a reflection sub-mirror 8, which is a spherical sub-mirror, a concave lens 3 for collimation, and a prism 7 that aligns the light fluxes that have passed through the concave lens 3 in the same direction. The power supply 70 is an electric circuit that supplies alternating current to the light source unit 10 and drives it to emit light in a desired manner.

In the light source unit 10, the discharge lamp 1 includes a body 11 that is formed of a light-transmissive quartz glass tube with a spherically convex central portion and radiates illumination light, and first and second sealing portions 13 and 14, each extending toward an end of the body 11. Examples of the discharge lamp 1 are discharge light emission-type lamps, such as a high-pressure mercury lamp and a metal-halide lamp.

In the discharge lamp 1, the body 11 has a discharge space 12 in which the tip of a first electrode 15 made of tungsten and the tip of a second electrode 16 also made of tungsten are disposed with a predetermined distance therebetween, and a gas that is a discharge medium containing a rare gas, a metal halide and the like is encapsulated. In the sealing portions 13 and 14, each extending toward an end of the body 11, metal foils 17a and 17b made of molybdenum are inserted and encapsulated in an airtight manner. The metal foils 17a and 17b are electrically connected to the basal portions of the first and second electrodes 15 and 16, respectively. When the power supply 70 applies alternating current to lead wires 18a and 18b connected to the metal foils 17a and 17b, arc discharge is generated between the pair of electrode 15 and 16, and the body 11 emits light of high brightness. The lead wire 18b and an associated trigger line 18c extend from the second sealing portion 14 of the discharge lamp 1, as shown in FIGS. 1 and 3. The trigger line 18c extends from the second sealing portion 14 of the discharge lamp 1 and disposed in a specific plane, which is the YZ plane including not only the boundary between first and second reflector portions 104 and 105, which will be described later, but also a system optical axis OA. Similarly, the lead wire 18b extends from the discharge lamp 1 and disposed in a specific plane, which is the YZ plane including not only the boundary between third and fourth reflector portions 106 and 107, which will be described later, but also the system optical axis OA. By disposing the trigger line 18c along the specific plane including the boundary between the first and second reflector portions 104 and 105 and the lead wire 18b along the specific plane including the boundary between the third and fourth reflector portions 106 and 107, wiring can be simplified and the influence on the light flux can be minimized.

The reflector 2 is an integrally formed member made of quartz glass including the first, second, third, and fourth reflector portions 104, 105, 106, and 107 described above, and a neck-like portion 2a into which the first sealing portion 13 of the discharge lamp 1 is inserted. The neck-like portion 2a, through which the first sealing portion 13 is inserted, also allows the reflector 2 to be aligned with and fixed to the body 11. The inner glass surface of the reflector 2 is shaped into an ellipsoidal surface, on which the reflection surface is formed. Although FIG. 1 shows only the first and third reflector portions 104 and 106 disposed on the +X axis side of the system optical axis OA, the second and fourth reflector portions 105 and 107 disposed on the −X axis side of the system optical axis OA are arranged in the same manner as the first and third reflector portions 104 and 106 when viewed from the X-axis direction, which is a first direction perpendicular to the system optical axis. Light fluxes 104b and 106b shown in FIG. 1 represent, for example, portions of the light fluxes 104b and 106b shown in FIG. 2 taken along the plane parallel to the Y direction and including the line AB (the plane substantially extending along the Z direction).

Figure 4:
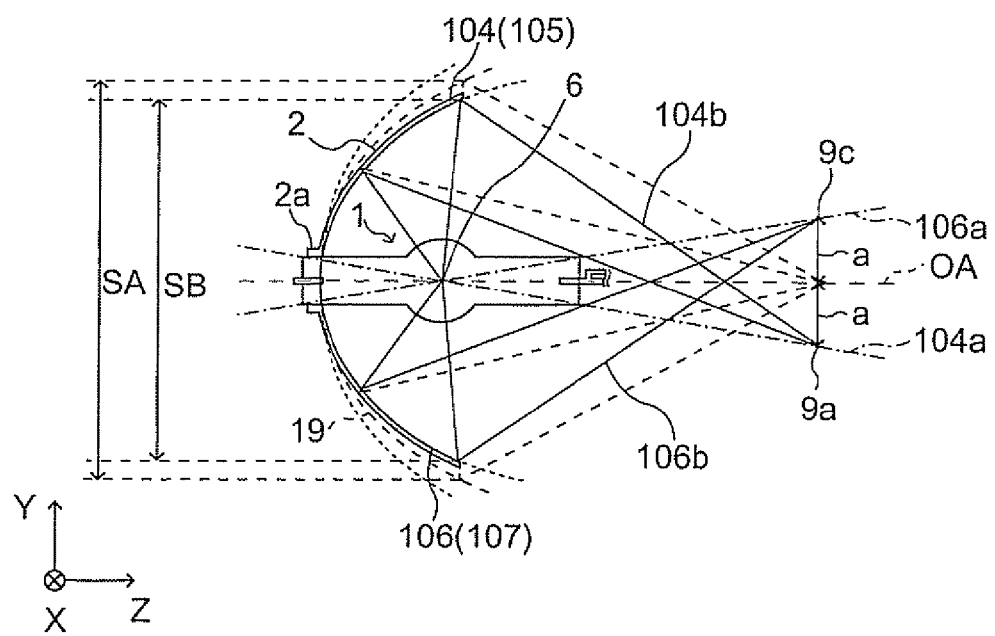
FIG. 4 is a side cross-sectional view primarily showing the light fluxes formed by a reflector in a light source unit shown in FIG. 1.
Figure 5:
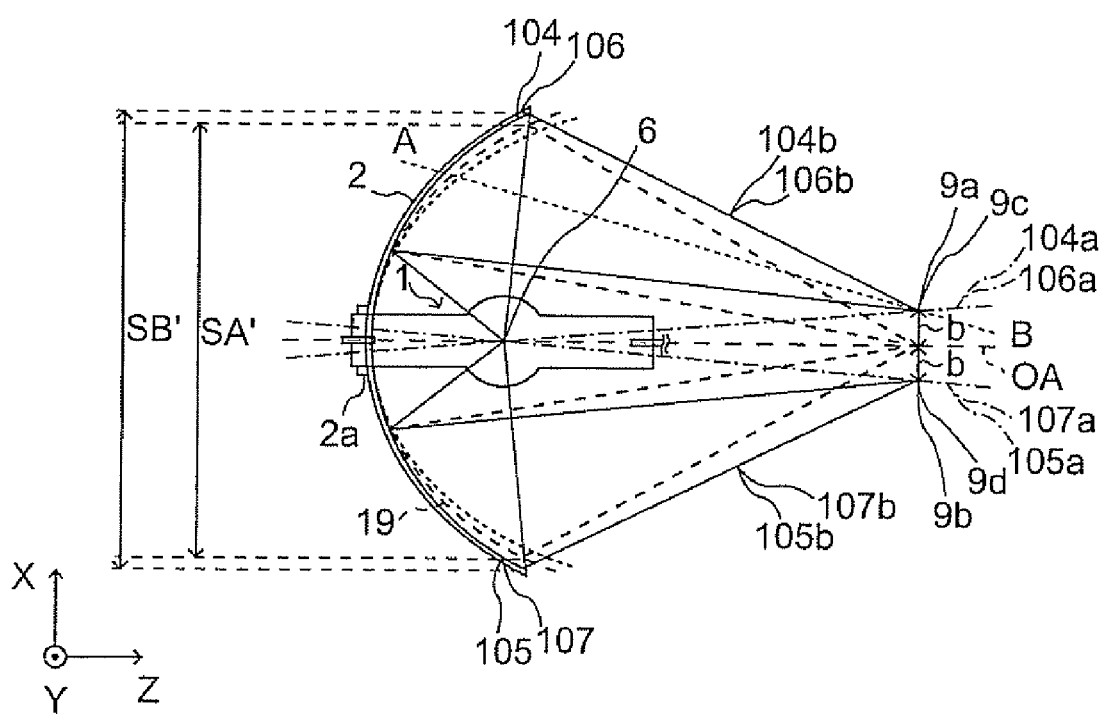
FIG. 5 is a plan sectional-view of the light source unit shown in FIG. 4.

FIGS. 4 and 5 are a side cross-sectional view and a plan sectional-view, respectively, primarily showing the light fluxes formed by the reflector 2 in the light source unit 10. The light fluxes 104b and 106b shown in FIG. 4 represent, for example, portions of the light fluxes 104b and 106b shown in FIG. 5 taken along the plane parallel to the Y direction and including the line AB. The reflector 2 is part of an ellipsoid 19 and has an ellipsoidal reflection surface. As shown in FIG. 3, the reflector 2 is formed of four portions divided by horizontal and vertical lines. That is, the first reflector portion 104, the second reflector portion 105, the third reflector portion 106, and the fourth reflector portion 107, the reflection surfaces of which are the respective four fan-shaped divided areas disposed at the upper-right, upper-left, lower-right, and lower-left of the ellipsoid 19, respectively, are combined into the reflector 2.

As shown in FIGS. 1 to 3, the first to fourth reflector portions 104 to 107 have ellipsoidal surfaces obtained by rotating the virtual ellipsoid 19, whose first focal point coincides with the light emitting point 1a of the discharge lamp 1, around the X and Y axes including the light emitting point 1a by predetermined angles to incline the axis of rotation of the ellipsoid 19 with respect to the system optical axis OA, which is the axis of the discharge lamp 1, and dividing the inclined ellipsoids by the XZ and YZ planes including the system optical axis OA.

As shown in FIG. 4, when the reflector 2 is viewed from the X direction, which is the first direction perpendicular to the system optical axis, the first and second reflector portions 104 and 105, which are the upper half of the reflector 2 on the +Y axis side of the system optical axis OA, have ellipsoidal surfaces, as their concave curved reflection surfaces, whose first focal points 6 coincide with the light emitting point (light emitting center) 1*a* of the discharge lamp 1 and whose second focal points 9*a* and 9*b* are disposed on the −Y axis side of the system optical axis OA. The axes of rotation 104*a* and 105*a* of the first and second reflector portions 104 and 105 are disposed in such a way that they are rotated around the X axis including the light emission point 1*a* clockwise (when viewed from the −X direction) and hence inclined from the XZ plane including the system optical axis OA, which is the axis of the discharge lamp 1. In other words, the first and second reflector portions 104 and 105, when viewed from the −X direction, coincide with part of the ellipsoidal surface obtained by rotating the virtual ellipsoid 19 clockwise around the X axis including the first focal point 6.

Similarly, as shown in FIG. 4, when the reflector 2 is viewed from the x direction, which is the first direction perpendicular to the system optical axis, the third and fourth reflector portions 106 and 107, which are the lower half of the reflector 2 on the −Y axis side of the system optical axis OA, have ellipsoidal surfaces, as their concave curved reflection surfaces, whose first focal points 6 coincide with the light emitting point (light emitting center) 1*a* of the discharge lamp 1 and whose second focal points 9*c* and 9*d* are disposed on the +Y axis side of the system optical axis OA. The axes of rotation 106*a* and 107*a* of the third and fourth reflector portions 106 and 107 are disposed in such a way that they are rotated around the X axis including the light emitting point 1*a* counterclockwise (when viewed from the −X direction) and hence inclined from the XZ plane. In other words, the third and fourth reflector portions 106 and 107, when viewed from the −X direction, coincide with part of the ellipsoidal surface obtained by rotating the virtual ellipsoid 19 counterclockwise around the X axis including the first focal point 6.

Therefore, the first and second reflector portions 104 and 105 are disposed in such a way that the positions of the second focal points 9*a* and 9*b* of the first and second reflector portions 104 and 105 are shifted around the first focal point 6 in the −Y direction by a distance "a" from the XZ plane including the system optical axis OA toward the third and fourth reflector portions 106 and 107. On the other hand, the third and fourth reflector portions 106 and 107 are disposed in such a way that the positions of the second focal points 9*c* and 9*d* of the third and fourth reflector portions 106 and 107 are shifted around the first focal point 6 in the +Y direction by the distance "a" from the XZ plane including the system optical axis OA toward the first and second reflector portions 104 and 105. That is, when viewed from the X direction, the first and second reflector portions 104, 105 and the third and fourth reflector portions 106, 107 have ellipsoidal surfaces, as their concave curved reflection surfaces, which are inclined from the virtual ellipsoid 19 to be closer to the system optical axis OA.

Further, as shown in FIG. 5, when the reflector 2 is viewed from the Y direction, which is a second direction perpendicular to the system optical axis OA and the first direction (X-axis direction), the first and third reflector portions 104 and 106, which are the left half of the reflector 2 on the +X axis side of the system optical axis OA, have ellipsoidal surfaces, as their concave curved reflection surfaces, whose first focal points 6 coincide with the light emitting point (light emitting center) 1*a* of the discharge lamp 1 and whose second focal points 9*a* and 9*c* are disposed on the +X axis side of the system optical axis OA. The axes of rotation 104*a* and 106*a* of the first and third reflector portions 104 and 106 are disposed in such a way that they are rotated around the Y axis including the light emission point (light emitting center) 1*a* counterclockwise (when viewed from the +Y direction) and hence inclined from the YZ plane. In other words, the first and third reflector portions 104 and 106, when viewed from the +Y direction, coincide with part of the ellipsoidal surface obtained by rotating the virtual ellipsoid 19 around the Y axis including the first focal point 6 counterclockwise (when viewed from the +Y direction).

Further, as shown in FIG. 5, when the reflector 2 is viewed from the Y direction, which is the second direction perpendicular to the system optical axis OA and the first direction (X-axis direction), the second and fourth reflector portions 105 and 107, which are the right half of the reflector 2 on the −X axis side of the system optical axis OA, have ellipsoidal surfaces, as their concave curved reflection surfaces, whose first focal points 6 coincide with the light emitting point (light emitting center) 1*a* of the discharge lamp 1 and whose second focal points 9*b* and 9*d* are disposed on the −X axis side of the system optical axis OA. The axes of rotation 105*a* and 107*a* of the second and fourth reflector portions 105 and 107 are disposed in such a way that they are rotated around the Y axis including the light emitting point 1*a* clockwise (when viewed from the +Y direction) and hence inclined from the YZ plane. In other words, the second and fourth reflector portions 105 and 107, when viewed from the +Y direction, coincide with part of the ellipsoidal surface obtained by rotating the virtual ellipsoid 19 around the Y axis including the first focal point 6 clockwise (when viewed from the +Y direction).

Therefore, the first and third reflector portions 104 and 106 are disposed in such a way that the positions of the second focal points 9*a* and 9*c* of the first and third reflector portions 104 and 106 are shifted around the first focal point 6 in the +X direction by a distance "b" from the YZ plane including the system optical axis OA toward the first and third reflector portions 104 and 106. On the other hand, the second and fourth reflector portions 105 and 107 are disposed in such a way that the positions of the second focal points 9*b* and 9*d* of the second and fourth reflector portions 105 and 107 are shifted around the first focal point 6 in the −X direction by the distance "b" from the YZ plane including the system optical axis OA toward the second and fourth reflector portions 105 and 107. That is, when viewed from the Y direction, the first and third reflector portions 104, 106 and the second and fourth reflector portions 105, 107 have ellipsoidal surfaces, as their concave curved reflection surfaces, which are inclined from the virtual ellipsoid 19 to be away from the system optical axis OA.

In summary, the second focal points 9*a*, 9*b*, 9*c*, and 9*d* of the reflector portions 104, 105, 106, and 107 are disposed, when viewed from the first direction parallel to the X axis (see FIG. 4), on the opposite side of the system optical axis OA to the respective reflector portions 104, 105, 106, and 107, and when viewed from the second direction parallel to the Y axis (see FIG. 5), on the side where the respective reflector portions 104, 105, 106, and 107 are present with respect to the system optical axis OA.

As a result, the light fluxes 104*b* and 106*b* reflected off the first and third reflector portions 104 and 106 intersect each other at positions apart from the system optical axis OA in the XZ plane, whereas the light fluxes 104*b* and 105*b* reflected off the first and second reflector portions 104 and 105 do not intersect each other. Similarly, the light fluxes 105b and 107b reflected off the second and fourth reflector portions 105 and 107 intersect each other at positions apart from the system optical axis OA in the XZ plane, whereas the light fluxes 107b and 106b reflected off the fourth and third reflector portions 107 and 106 do not intersect each other. The light paths of the light fluxes 104b, 105b, 106b, and 107b reflected off the reflector portions 104, 105, 106, and 107 are disposed in a twisted manner with respect to the system optical axis OA, so that the discharge lamp 1 do not block the light paths.

The above arrangement will be described again with reference to FIG. 3. When viewed from the Z direction, the first reflector portion 104 of the reflector 2 is in the first quadrant and the second focal point 9a of the first reflector portion 104 is in the fourth quadrant, so that the system optical axis OA perpendicular to the plane of view (parallel to the Z direction) and the reflected light fluxes directed from the first reflector portion 104 toward the second focal point 9a are disposed in a twisted manner with respect to each other. The second reflector portion 105 is in the second quadrant and the second focal point 9b of the second reflector portion 105 is in the third quadrant, so that the system optical axis OA perpendicular to the plane of view and the reflected light fluxes directed from the second reflector portion 105 toward the second focal point 9b are disposed in a twisted manner with respect to each other. Similarly, the third reflector portion 106 is in the fourth quadrant and the second focal point 9c of the third reflector portion 106 is in the first quadrant, so that the system optical axis OA perpendicular to the plane of view and the reflected light fluxes directed from the third reflector portion 106 toward the second focal point 9c are disposed in a twisted manner with respect to each other. Further, the fourth reflector portion 107 is in the third quadrant and the second focal point 9d of the fourth reflector portion 107 is in the second quadrant, so that the system optical axis OA perpendicular to the plane of view and the reflected light fluxes directed from the fourth reflector portion 107 toward the second focal point 9d are disposed in a twisted manner with respect to each other.

Referring back to FIG. 1, the reflection sub-mirror 8 is disposed on the light flux-exiting front side of the discharge lamp 1 and faces the reflector 2. Approximately half of the light flux-exiting front side of the discharge lamp 1 is covered with the reflection sub-mirror 8. The reflection sub-mirror 8 is designed to return the light-source light emitted from the light emitting point 1a back to the light emitting point 1a. That is, the light-source light emitted from the vicinity of the light emitting point 1a is reflected off the reflection surface of the reflection sub-mirror 8 and temporarily collected back at the vicinity of the light emitting point 1a, and then exits out of the discharge lamp 1 without being blocked by the reflection sub-mirror 8. The reflection sub-mirror 8 can guide the light, among the light emitted from the discharge lamp 1, which does not reach the reflector 2 to the reflector 2, so that the light-source light can be efficiently collected and effectively used.

After the discharge lamp 1 is turned on, the light flux emitted from the discharge lamp 1 is reflected off the reflection surfaces of the reflector portions 104, 105, 106, and 107, with part of the light flux being reflected off the reflection surface of the reflection sub-mirror 8 and then further reflected off the reflection surfaces of the reflector portions 104, 105, 106, and 107. Then, the light fluxes reflected off the reflector portions 104, 105, 106, and 107 are focused at the second focal points 9a, 9b, 9c, and 9d of the respective ellipsoidal surfaces. That is, the reflector 2 and the reflection sub-mirror 8 have reflection curved surfaces substantially axially symmetric with respect to the system optical axis OA.

The concave lens 3 is a collimator lens and faces the reflector 2 coaxially therewith. That is, the central optical axis of the concave lens 3 coincides with the system optical axis OA, which coincides with the axis of rotation of the reflector 2 as a whole. Further, the concave lens 3 is disposed at a position outside the region where the light fluxes reflected off the first, second, third, and fourth reflector portions 104, 105, 106, and 107 intersect one another, that is, a position behind the region where the light fluxes reflected off the first and third reflector portions 104 and 106 intersect each other. Similarly, the concave lens 3 is disposed at a position behind the region where the light fluxes reflected off the second and fourth reflector portions 105 and 107 intersect each other.

The concave lens 3 has first, second, third, and fourth concave lens portions 3a, 3b, 3c, and 3d corresponding to the first, second, third, and fourth reflector portions 104, 105, 106, and 107, respectively, with reference to specific surfaces that are boundary planes between adjacent pairs of the first, second, third, and fourth reflector portions 104, 105, 106, and 107, one of the specific surfaces being parallel to the XZ plane and the other being parallel to the YZ plane. The first to fourth concave lens portions 3a to 3d are integrally formed into the concave lens 3. When the optical axes of the concave lens portions 3a, 3b, 3c, and 3d coincide with the axes of rotation 104a, 105a, 106a, and 107a of the reflector portions 104, 105, 106, and 107, respectively, each of the concave lens portions 3a, 3b, 3c, and 3d serves as a collimator lens that collimates and outputs the light-source light reflected off the corresponding one of the reflector portions 104, 105, 106, and 107. That is, even when the light fluxes reflected off the reflector portions 104, 105, 106, and 107 temporarily intersect one another, the concave lens 3 can collimates the light fluxes and outputs them at positions close to the system optical axis OA. The collimated light fluxes outputted from the concave lens 3 enter the following prism 7.

The prism 7 is disposed on the light-exiting side of the concave lens 3 and outside the region where the light fluxes reflected off the first and third reflector portions 104 and 106 intersect each other, that is, a position behind the region where the light fluxes reflected off the first and third reflector portions 104 and 106 pass through the concave lens 3. Similarly, the prism 7 is disposed at a position outside the region where the light fluxes reflected off the second and fourth reflector portions 105 and 107 intersect each other, that is, a position behind the region where the light fluxes reflected off the second and fourth reflector portions 105 and 107 pass through the concave lens 3. The prism 7 has first, second, third, and fourth prism portions 7a, 7b, 7c, and 7d corresponding to the first, second, third, and fourth reflector portions 104, 105, 106, and 107, respectively, with reference to the specific surfaces, one of which is parallel to the XZ plane and the other is parallel to the YZ plane. The first to fourth prism portions 7a to 7d are integrally formed into the prism 7. Each of the first, second, third, and fourth prism portions 7a, 7b, 7c, and 7d has a convex surface on the light-source light-incident side and a concave surface on the light-exiting side when viewed from the x direction. The first prism portion 7a has a wedge angle that increases in the +Y and −X directions. The second prism portion 7b has a wedge angle that increases in the +Y and +X directions. The third prism portion 7c has a wedge angle that increases in the −Y and −X directions. The fourth prism portion 7d has a wedge angle that increases in the −Y and +X directions. The prism 7 can make the collimated light fluxes that have exited from the concave lens 3 parallel to the system optical axis OA and traveling along lines close thereto.

According to the light source device 100 described above, the ellipsoid 19 is divided into the four portions, the first, second, third, and fourth reflector portions 104, 105, 106, and 107, and, as shown in FIGS. 3, 5 and the like, when viewed from the light-exiting side, the pair of the first and third reflector portions 104 and 106 on the right (the +X side of the system optical axis OA) and the pair of the second and fourth reflector portions 105 and 107 on the left (the –X side of the system optical axis OA) are inclined in such a way that the distance between the tips of the pairs increases. That is, since the axes of rotation 104a, 106a of the first and third reflector portions 104, 106 on one side and the axes of rotation 105a, 107a of the second and fourth reflector portions 105, 107 on the other side are inclined around the first focal point 6 in such a way that the reflected light fluxes do not intersect each other without being blocked by the discharge lamp 1, it is possible to increase the usage efficiency of the light outputted from the reflector 2. Although the length SB' in the minor-axis direction of the reflector 2 is slightly longer than the length SA' in the minor-axis direction of the ellipsoid 19, the difference minimally affect the size of the reflector 2.

On the other hand, as shown in FIGS. 3, 4 and the like, the pair of the first and second reflector portions 104 and 105 on the upper side (the +Y side of the system optical axis OA) and the pair of the third and fourth reflector portions 106 and 107 on the lower side (the –Y side of the system optical axis OA) are inclined in such a way that the distance between the tips of the pairs decreases. That is, since the axes of rotation 104a, 105a of the first and second reflector portions 104, 105 on one side and the axes of rotation 106a, 107a of the third and fourth reflector portions 106, 107 on the other side are inclined around the first focal point 6 in such a way that the reflected light fluxes intersect each other, the length SB in the minor-axis direction of the reflector 2 is shorter than the length SA in the minor-axis direction of the ellipsoid 19. The thickness of the light source device can be thus reduced.

Further, by disposing the boundary between the first and second reflector portions 104, 105 and the third and fourth reflector portions 106, 107 in the XZ or YZ plane including the system optical axis OA, that is, in the specific plane, the second focal points 9a, 9b, 9c, and 9d for the light-source light fluxes reflected off the reflector portions 104, 105, 106, and 107 can be disposed at positions symmetric with respect to the specific plane. The unbalance between the light fluxes can thus be reduced.

2. Projector

Figure 6:
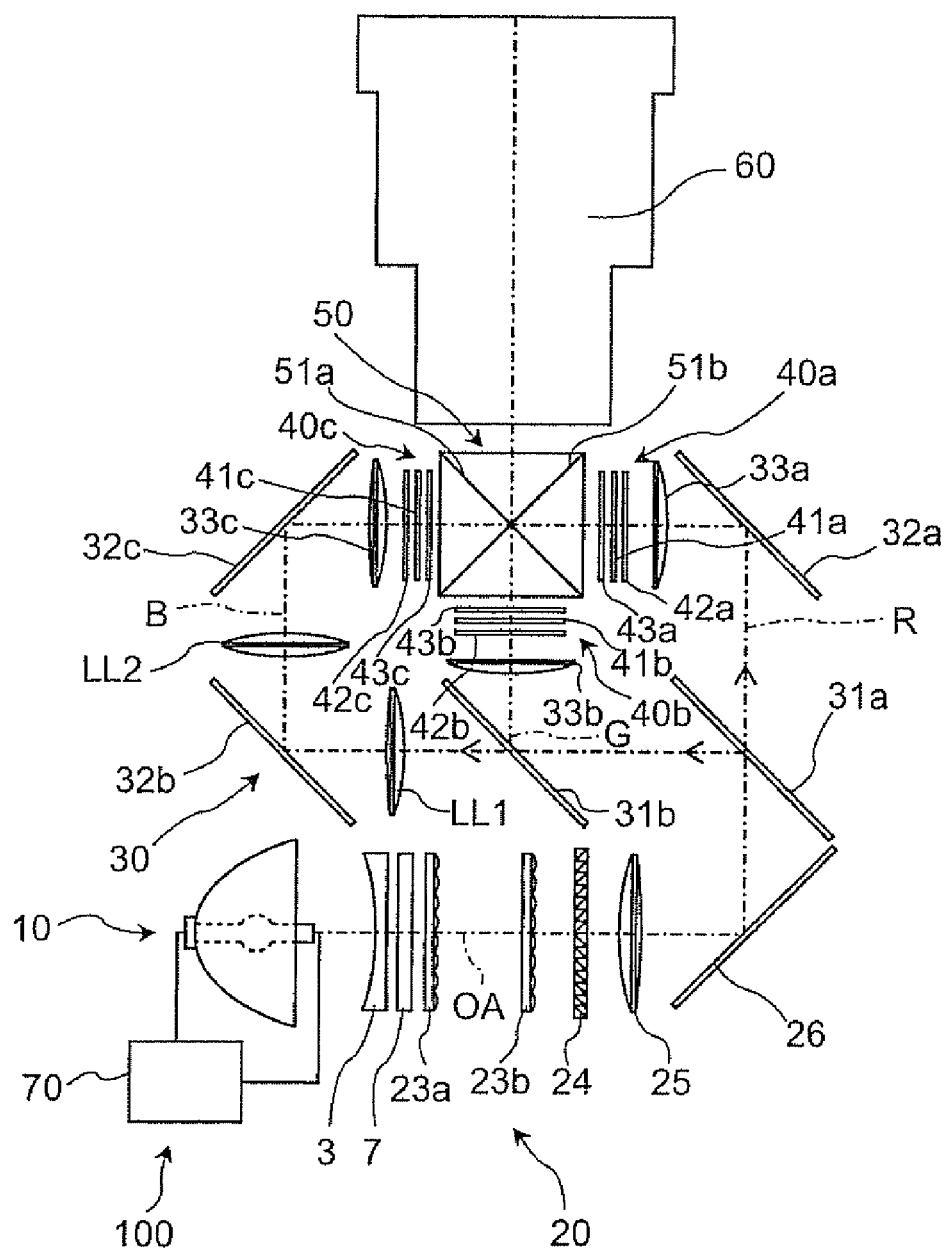
FIG. 6 is a conceptual view for explaining a projector with the light source device shown in FIG. 1.

FIG. 6 is a conceptual view for explaining a projector in which the light source device 100, for example, shown in FIG. 1 is incorporated. The projector 200 in this embodiment includes the light source device 100, an illumination system 20, a color separation system 30, liquid crystal light valves 40a, 40b, and 40c, which are light modulators, a cross dichroic prism 50, and a projection lens 60, which is a projection system. The light source device 100 is the same as that shown in FIG. 1, and hence the description thereof will be omitted.

The illumination system 20 includes first and second fly-eye lenses 23a and 23b, which are a pair of fly-eye lenses that form an optical integration system for separation and superimposition of light, a polarization conversion element 24 that aligns the polarization directions of light, a superimposing lens 25 that superimposes the light fluxes that have passed through the fly-eye lenses 23a and 23b, and a mirror 26 that folds the light path. These components make the illumination light uniform. In the illumination system 20, each of the first and second fly-eye lenses 23a and 23b is formed of a plurality of element lenses arranged in a matrix. These element lenses divide the light that has passed through the concave lens 3 and the like, and converge/diverge each of the divided light fluxes. The polarization conversion element 24 is formed of a PBS array, and serves to align the polarization directions of the segmental light fluxes divided by the first fly-eye lens 23a into linearly polarized light fluxes having one common polarization direction. The superimposing lens 25 converges the illumination light fluxes as a whole that has passed through the polarization conversion element 24 as appropriate to allow superimposed illumination on the intended areas of the liquid crystal light valves 40a, 40b, and 40c, which are light modulators for respective colors located in a downstream section.

The color separation system 30 includes first and second dichroic mirrors 31a and 31b, reflection mirrors 32a, 32b, and 32c, and three field lenses 33a, 33b, and 33c. The color separation system 30 divides the illumination light formed by the illumination system 20 into light fluxes of three colors, red (R), green (G), and blue (B), and guides them to the liquid crystal light valves 40a, 40b, and 40c in a downstream section. Specifically, among the three RGB colors, the first dichroic mirror 31a transmits the R light and reflects the G and B lights For the two G and B colors, the second dichroic mirror 31b reflects the G light and transmits the B light. Then, in the color separation system 30, the R light that has passed through the first dichroic mirror 31a is reflected off the reflection mirror 32a and enters the field lens 33a that adjusts the angle of incidence. The G light reflected off the first dichroic mirror 31a and further reflected off the second dichroic mirror 31b enters the field lens 33b that adjusts the angle of incidence. The B light that has passed through the second dichroic mirror 31b passes through relay lenses LL1 and LL2, is reflected off the reflection mirrors 32b and 32c, and enters the field lens 33c that adjusts the angle of incidence.

The liquid crystal light valves 40a, 40b, and 40c, each of which is a non-light emissive light modulator that modulates the spatial intensity distribution of the incident illumination light, includes three liquid crystal panels 41a, 41b, and 41c to be illuminated with the respective color light fluxes outputted from the color separation system 30, three first polarization filters 42a, 42b, and 42c disposed on the light-incident side of the liquid crystal panels 41a, 41b, and 41c, and three second polarization filters 43a, 43b, and 43c disposed on the light-exiting side of the liquid crystal panels 41a, 41b, and 41c. The R light that has passed through the first dichroic mirror 31a enters the liquid crystal light valve 40a via the field lens 33a and the like, and illuminates the liquid crystal panel 41a in the liquid crystal light valve 40a. The G light reflected off both the first and second dichroic mirrors 31a and 31b enters the liquid crystal light valve 40b via the field lens 33b and the like, and illuminates the liquid crystal panel 41b in the liquid crystal light valve 40b. The B light that has been reflected off the first dichroic mirror 31a and passed through the second dichroic mirror 31b enters the liquid crystal light valve 40c via the field lens 33c and the like, and illuminates the liquid crystal panel 41c in the liquid crystal light valve 40c. Each of the liquid crystal panels 41a to 41c modulates the spatial intensity distribution of the incident illumination light flux, and the three color light fluxes incident on the liquid crystal panels 41a to 41c are modulated according to drive signals or image signals inputted to the liquid crystal panels 41a to 41c as electric signals. In this process, each of the first polarization filters 42a to 42c adjusts the polarization direction of the illumination light to be incident on the corresponding one of the liquid crystal panels 41a to 41c, and each of the second polarization filters 43a to 43c extracts modulated light having a predetermined polarization direction from the modulated light that may have various polarization directions outputted from the corresponding one of the liquid crystal panels 41a to 41c. In this way, each of the liquid crystal light valves 40a, 40b, and 40c forms image light having the corresponding color.

The cross dichroic prism 50 combines the color image light fluxes from the liquid crystal light valves 40a, 40b, and 40c. Specifically, the cross dichroic prism 50 is formed by bonding four rectangular prisms and thus has a substantially square shape when viewed from the top. A pair of intersecting dielectric multilayer films 51a and 51b are formed along the interfaces between these bonded rectangular prisms. One of the dielectric multilayer films, the first dielectric multilayer film 51a, reflects the R light, whereas the other one, the second dielectric multilayer film 51b reflects the B light. The cross dichroic prism 50 reflects the R light from the liquid crystal light valve 40a off the dielectric multilayer films 51a and outputs it to the right when viewed in the traveling direction. The cross dichroic prism 50 transmits the G light from the liquid crystal light valve 40b through the dielectric multilayer films 51a and 51b and lets the light go straight. The cross dichroic prism 50 reflects the B light from the liquid crystal light valve 40c off the dielectric multilayer film 51b and outputs the light to the left when viewed in the travelling direction. The cross dichroic prism 50 thus combines the R light, G light, and B light to form combined light, which is image light carrying a color image.

The projection lens 60 enlarges the image light, which is the combined light formed through the cross dichroic prism 50, at a desired magnification, and projects the color image on a screen (not shown).

Since the projector 200 according to this embodiment uses the light source device 100 shown in FIG. 1, the projector 200 can be smaller and lighter by reducing the size of the light source device 100.

While the invention has been described with reference to the above embodiment, the invention is not limited thereto. For example, although the light source device 100 of the above embodiment includes the light source unit 10 and the power supply 70, the power supply 70 may be separately incorporated in the projector 200.

Although the above embodiment has been described with reference to the multi-reflection lamp in which the light source unit 10 includes the reflector 2 and the sub-mirror 8, a single-reflection lamp without the sub-mirror 8 may be used.

Although in the above embodiment, the reflector 2 is divided into four, the reflector may be divided into eight. When the reflector 2 is divided into eight, for example, in FIG. 3, the first reflector portion 104 in the first quadrant is divided into two, and their second focal points are disposed in the fourth quadrant (see the focal point 9a, for example). The second reflector portion 105 in the second quadrant is divided into two, and their second focal points are disposed in the third quadrant (see the focal point 9b, for example) The third reflector portion 106 in the fourth quadrant is divided into two, and their second focal points are disposed in the first quadrant (see the focal point 9c, for example). The fourth reflector portion 107 in the third quadrant is divided into two, and their second focal points are disposed in the second quadrant (see the focal point 9d, for example).

Although the above embodiment has been described with reference to the case where the light paths of the light fluxes reflected off the first and second reflector portions 104 and 105 is not blocked by the discharge lamp 1 at all, part of the light paths may be blocked by the discharge lamp 1.

In the above embodiment, the position where the prism 7 is disposed is not limited to that shown, for example, in FIG. 1 as long as the prism 7 can adjust the light fluxes in such a way they exit parallel to the system optical axis OA along lines close thereto. For example, the prism 7 may be closer to the concave lens 3.

In the above embodiment, the shape of the reflector 2 is not limited to ellipsoidal, but may be parabolic. In this case, the collimator lens may not be used.

Although the above embodiment has been described with reference to the case where the invention is applied to a transmission projector, the invention is applicable to a reflection projector. The word "transmission" used herein means that the liquid crystal light valve including the liquid crystal panel and the like is of light-transmission type, and the word "reflection" used herein means that the liquid crystal light valve is of light-reflection type. In a reflection projector, the liquid crystal light valve can be formed of only a liquid crystal panel, and a pair of polarization filters are not required. The light modulator is not limited to a liquid crystal panel, but may be, for example, a light modulator using micromirrors.

A projector is either a front projector in which an image is projected from the viewer's side, where the viewer observes the projection screen, or a rear projector in which an image is projected from the side opposite to the viewer's side. The configuration of the projector 200 shown in FIG. 6 is applicable to both types of projectors.

Although the above embodiment has been described with reference to only the projector 200 using the three liquid crystal panels 41a to 41c, the invention is applicable to a projector using only one liquid crystal panel, a projector using two liquid crystal panels, and a projector using four or more liquid crystal panel.

What is claimed is:

1. A light source device comprising:
   a discharge lamp that generates light-source light; and
   a reflection mirror having a plurality of concave curved surfaces that reflect the light-source light emitted from the discharge lamp, wherein
   each of the plurality of concave curved surfaces is an ellipsoidal surface,
   a first focal point of each of the ellipsoidal surfaces that form the plurality of concave curved surfaces is disposed at the light emitting center of the discharge lamp,
   a second focal point of each of the ellipsoidal surfaces that form the plurality of concave curved surfaces is disposed, when viewed from a predetermined first direction perpendicular to a system optical axis passing through the light emitting center, on the opposite side of the system optical axis to the ellipsoidal surface, and when viewed from a second direction perpendicular to the system optical axis and the first direction, on the side where the ellipsoidal surface is present with reference to the system optical axis, and
   the reflection mirror is formed of at least four concave curved surfaces.

2. The light source device according to claim 1, wherein in the reflection mirror, the boundary between an adjacent pair of the concave curved surfaces is disposed in a plane including the system optical axis.

3. The light source device according to claim 1 further comprising:
   a sub-mirror that reflects the light-source light emitted from the discharge lamp toward the side of the reflection mirror.

4. The light source device according to claim 1, wherein at least one of a lead wire and a trigger wire extending from the discharge lamp is disposed in a specific plane including the system optical axis and the boundary between an adjacent pair of the concave curved surfaces.

5. The light source device according to claim 1 further comprising:
   a collimator lens having a plurality of lens portions that collimate the light reflected off the concave curved surfaces of the reflection mirror, and a prism having a plurality of prism portions that adjust the light collimated by the plurality of lens portions to be parallel to the system optical axis.

6. The light source device according to claim 5, wherein the collimator lens and the prism are disposed at positions outside the region where the light fluxes from the plurality of concave curved surfaces intersect one another.

7. A projector comprising:
the light source device according to claim 1,
a light modulator illuminated with the illumination light from the light source device; and
a projection system that projects image light from the light modulator.

8. The projector according to claim 7, wherein in the reflection mirror, the boundary between an adjacent pair of the concave curved surfaces is disposed in a plane including the system optical axis.

9. The projector according to claim 7 further comprising:
a sub-mirror that reflects the light-source light emitted from the discharge lamp toward the side of the reflection mirror.

10. The projector light according to claim 7, wherein at least one of a lead wire and a trigger wire extending from the discharge lamp is disposed in a specific plane including the system optical axis and the boundary between an adjacent pair of the concave curved surfaces.

11. The projector according to claim 7 further comprising:
a collimator lens having a plurality of lens portions that collimate the light reflected off the concave curved surfaces of the reflection mirror, and
a prism having a plurality of prism portions that adjust the light collimated by the plurality of lens portions to be parallel to the system optical axis.

12. The projector according to claim 11, wherein the collimator lens and the prism are disposed at positions outside the region where the light fluxes from the plurality of concave curved surfaces intersect one another.

13. A light source device comprising:
a discharge lamp that generates light-source light; and
a reflection mirror having a plurality of concave curved surfaces that reflect the light-source light emitted from the discharge lamp, wherein
each of the plurality of concave curved surfaces is an ellipsoidal surface,
a first focal point of each of the ellipsoidal surfaces that form the plurality of concave curved surfaces is disposed at the light emitting center of the discharge lamp,
a second focal point of each of the ellipsoidal surfaces that form the plurality of concave curved surfaces is disposed, when viewed from a predetermined first direction perpendicular to a system optical axis passing through the light emitting center, on the opposite side of the system optical axis to the ellipsoidal surface, and when viewed from a second direction perpendicular to the system optical axis and the first direction, on the side where the ellipsoidal surface is present with reference to the system optical axis, and
at least one of a lead wire and a trigger wire extending from the discharge lamp is disposed in a specific plane including the system optical axis and the boundary between an adjacent pair of the concave curved surfaces.

14. A light source device comprising:
a discharge lamp that generates light-source light;
a reflection mirror having a plurality of concave curved surfaces that reflect the light-source light emitted from the discharge lamp;
a collimator lens having a plurality of lens portions that collimate the light reflected off the concave curved surfaces of the reflection mirror; and
a prism having a plurality of prism portions that adjust the light collimated by the plurality of lens portions to be parallel to a system optical axis, wherein
each of the plurality of concave curved surfaces is an ellipsoidal surface,
a first focal point of each of the ellipsoidal surfaces that form the plurality of concave curved surfaces is disposed at the light emitting center of the discharge lamp, and
a second focal point of each of the ellipsoidal surfaces that form the plurality of concave curved surfaces is disposed, when viewed from a predetermined first direction perpendicular to the system optical axis passing through the light emitting center, on the opposite side of the system optical axis to the ellipsoidal surface, and when viewed from a second direction perpendicular to the system optical axis and the first direction, on the side where the ellipsoidal surface is present with reference to the system optical axis.

* * * * *